United States Patent [19]

Harbaugh et al.

[11] 4,402,482
[45] Sep. 6, 1983

[54] PRECISION TRAVELING OPTICAL TABLE ASSEMBLY

[75] Inventors: Steven K. Harbaugh, Anaheim; Frank R. Mitchell, South Pasadena, both of Calif.

[73] Assignee: American Hoechst Corporation, Somerville, N.J.

[21] Appl. No.: 167,744

[22] Filed: Jul. 14, 1980

Related U.S. Application Data

[63] Continuation of Ser. No. 7,663, Jan. 29, 1979, which is a continuation of Ser. No. 805,433, Jun. 10, 1977, abandoned.

[51] Int. Cl.³ .......................................... F16M 13/00
[52] U.S. Cl. .................................... 248/466; 248/424
[58] Field of Search .............. 248/424, 646, 656, 657, 248/466

[56] References Cited

U.S. PATENT DOCUMENTS

| | | | |
|---|---|---|---|
| 565,346 | 8/1896 | Goodyear | 248/678 X |
| 1,477,219 | 12/1923 | Halvorsen | 269/60 |
| 2,370,048 | 2/1945 | Koch | 248/651 |
| 2,418,639 | 4/1947 | Horman | 248/651 |
| 3,337,732 | 8/1967 | Opocensky | 269/60 X |
| 3,463,137 | 8/1969 | Hare | 248/651 X |
| 4,131,029 | 12/1978 | Harbaugh et al. | 74/89.15 |

FOREIGN PATENT DOCUMENTS 1118106  6/1968  United Kingdom ................ 248/646

*Primary Examiner*—William H. Schultz
*Attorney, Agent, or Firm*—Flehr, Hohbach, Test, Albritton & Herbert

[57] ABSTRACT

Precision traveling optical table assembly having a rigid support framework and a rigid rectangular framework. The rigid rectangular framework is supported at three locations upon the rigid support framework. The rectangular framework includes a pair of spaced parallel rails. An optical table is provided. Carriages are mounted upon the pair of rails for longitudinal movement relative to the rails. The optical table is supported at only three locations from the carriages. A drive mechanism is connected between the carriages and the rectangular framework for causing relative movement between the optical table and the rectangular framework. At least one optical element is carried by the optical table.

11 Claims, 6 Drawing Figures

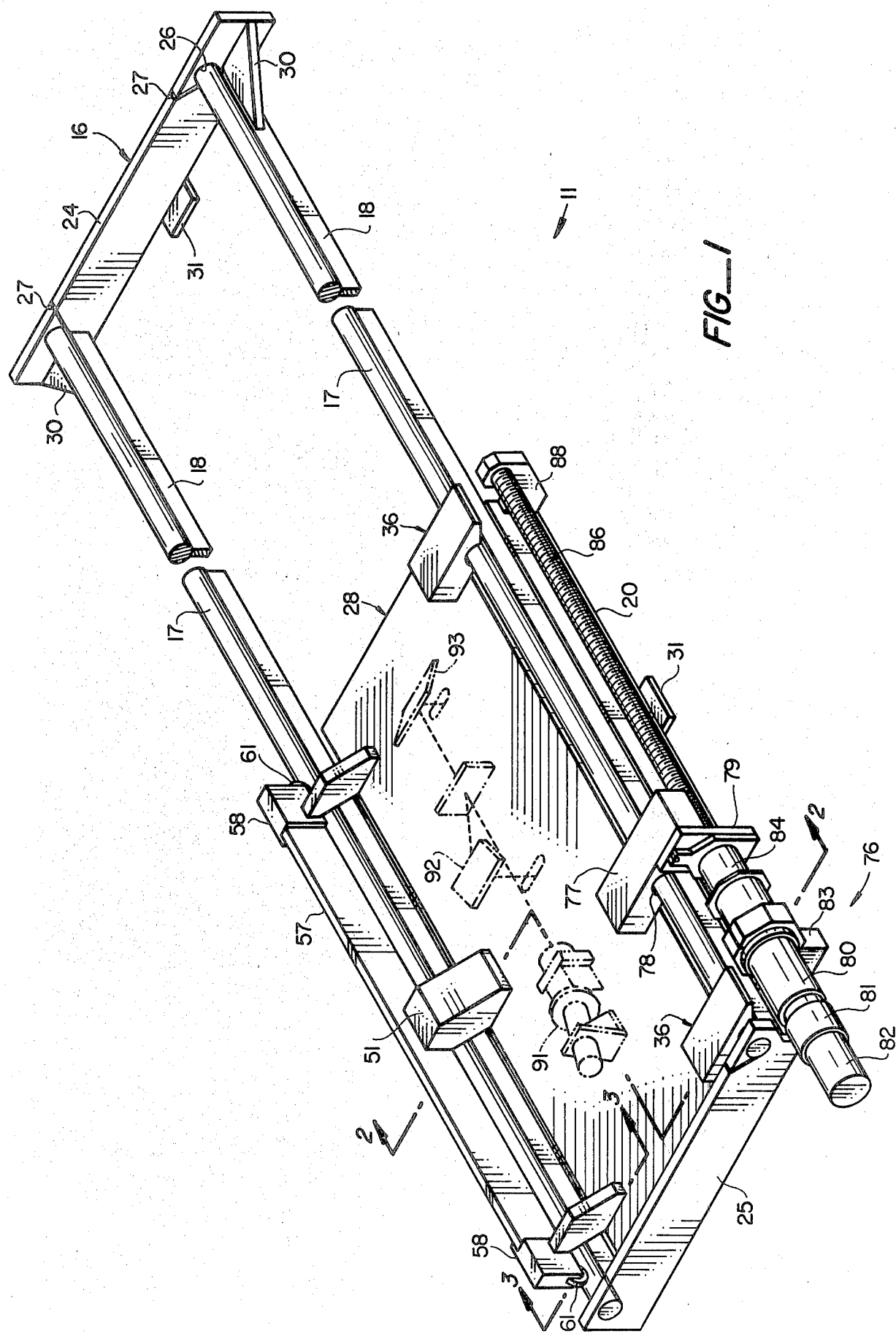
FIG_1

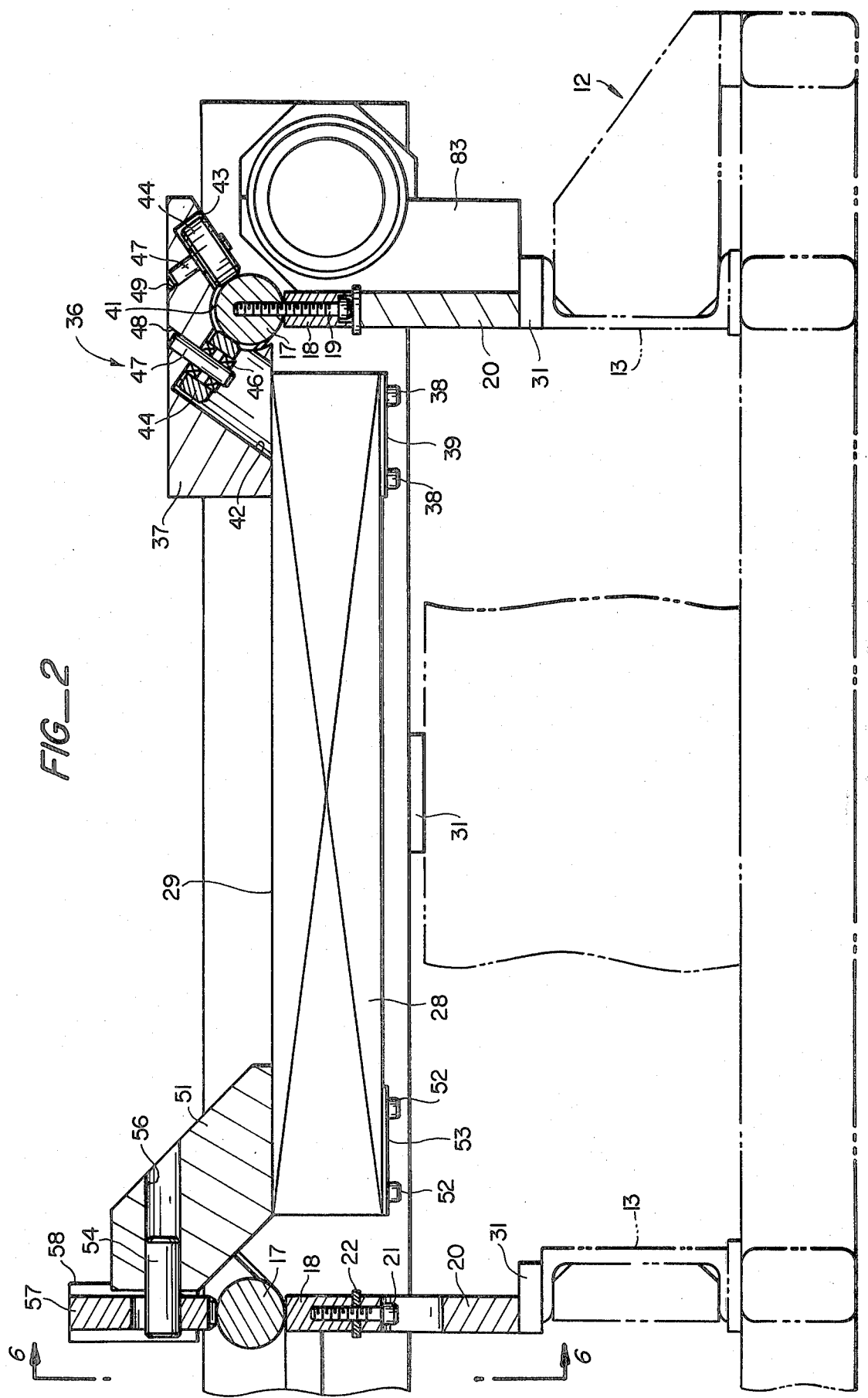
FIG_2

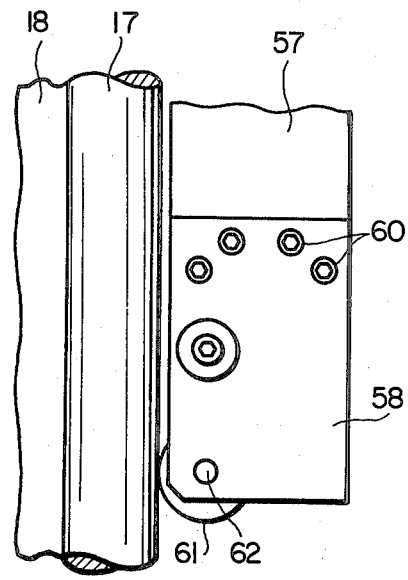
FIG_5
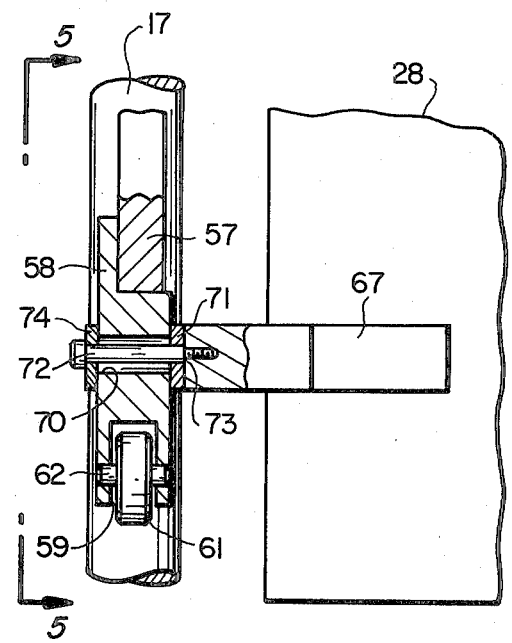
FIG_4
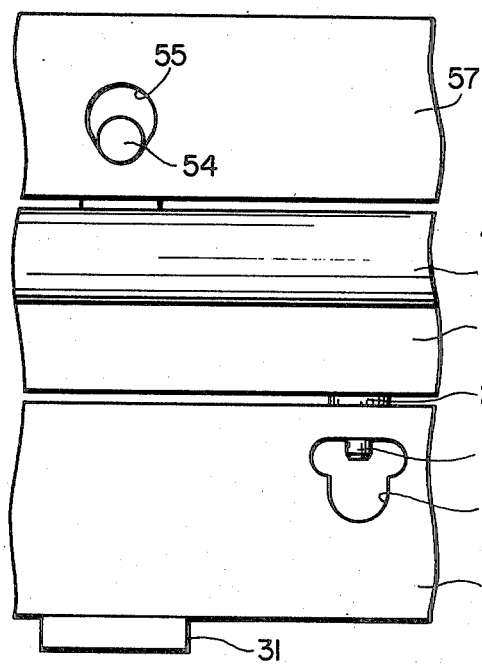
FIG_6
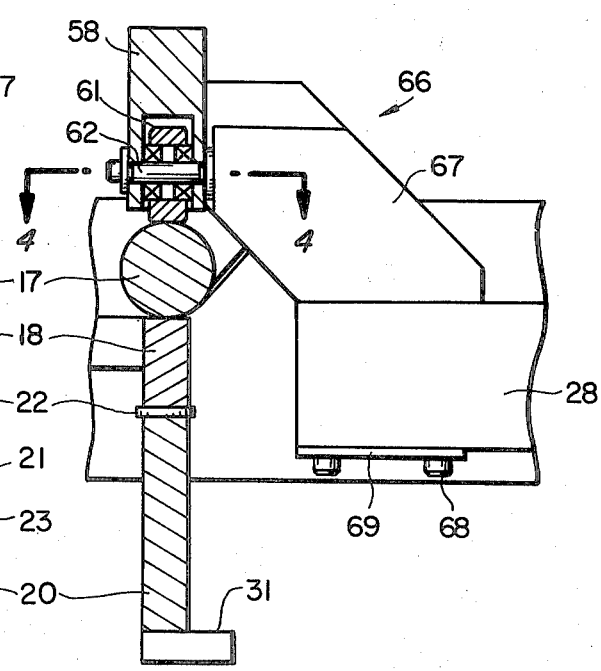
FIG_3

PRECISION TRAVELING OPTICAL TABLE ASSEMBLY

This is a continuation of application Ser. No. 7,663 filed Jan. 29, 1979, which was a continuation of application Ser. No. 805,443, filed June 10, 1977, now abandoned.

BACKGROUND OF THE INVENTION

Traveling optical tables have heretofore been provided. However, they have been subject to a number of disadvantages as, for example, they have had a tendency to droop in various positions which would cause distortion of the optical images. In addition, they have been subject to vibration during operation. There is, therefore, a need for a new and improved optical table assembly.

SUMMARY OF THE INVENTION AND OBJECTS

The precision optical traveling table assembly is comprised of a rigid support framework. A rectangular framework is provided. Means is provided for supporting the rectangular framework upon the support framework at only three locations. The rectangular framework includes a pair of spaced parallel rails. An optical table is provided. Carriage means is mounted on the pair of rails for movement longitudinally relative to the rails. Means is provided for supporting the optical table from the carriage means at only three locations on the optical table. Means is connected between the carriage means and the rectangular framework for causing relative longitudinal movement between the table and the rectangular framework. At least one optical element is carried by the optical table.

In general, it is an object of the present invention to provide a precision traveling optical table assembly which is not subject to drooping or distortion.

Another object of the invention is to provide an optical table assembly of the above character which is free of vibration during movement.

Another object of the invention is to provide an optical assembly of the above character in which the table can merely be lifted off of the supporting framework.

Another object of the invention is to provide optical table assembly which will operate satisfactorily even when the support rails for the optical table are not perfectly parallel.

Another object of the invention is to provide an optical table assembly of the above character in which a three point mounting is utilized for supporting the optical table.

Additional objects and features of the invention will appear from the following description in which the preferred embodiment is set forth in detail in conjunction with the accompanying drawings.

BRIEF DESCRIPTION OF THE DRAWINGS

FIG. 1 is an isometric view of a traveling optical table assembly incorporating the present invention.

FIG. 2 is a cross sectional view taken along the line 2—2 of FIG. 1 showing the optical table assembly mounted upon a support framework.

FIG. 3 is a cross sectional view taking along the line 3—3 of FIG. 1.

FIG. 4 is a cross sectional view taken along the line 4—4 of FIG. 3.

FIG. 5 is a partial side elevational view of a portion of one of the carriages taken along the lines 5—5 of FIG. 4.

FIG. 6 is a partial side elevational view looking along the line 6—6 in FIG. 2 and showing the connections between the optical table and the rectangular framework.

DESCRIPTION OF THE PREFERRED EMBODIMENTS

The precision traveling optical table assembly 11 which is shown in the drawings is mounted upon a rigid support framework 12. The support framework 12 includes a pair of parallel U-shaped channel members 13 which extend longitudinally of the optical table assembly 11. The support framework 12 noramlly rests upon the floor and has dimensions of approximately 10 feet by 5 feet and is approximately 3 feet in height.

The optical table assembly 11 includes a rigid rectangular framework 16. The rectangular framework 16 consists of a pair of precision centerless ground cylindrical rods or rails 17 which are spaced apart and are generally parallel. Elongate stiffeners 18 with machined straight surfaces are provided for stiffening the rods 17 and are secured to the rods at spaced apart points by cap screws 19 (see FIG. 2). Additional elongate stiffeners 20 are provided which are secured to the stiffeners 18 at two spaced apart points by cap screws 21. A spacer 22 is provided between each of the stiffeners 18 and 20 for each cap screw 21. The cap screws 21 are accessible through holes 23 provided in the stiffeners 20. The stiffeners 20 are secured to the stiffeners 18 at only two points so that the long stiffeners 18 will not be bowed by the shorter stiffeners 20.

The ends of the rods or rails 17 are fastened together by tie bars 24 and 25. The tie bars 24 and 25 are provided with holes 26 for receiving the ends of the rods. A slot 27 is provided for each of the holes 26 in the tie bars 24 and 25 and extends through the top side of the tie bar and extends into the hole tangentially of the hole. The slot 27 is provided so that the ends of the tie bars 24 and 25 can be inserted into the holes 26 and then can be clamped in position by screws (not shown) extending through the slots 27 and clamping the ends of the rod 17 into the tie bars 24 and 25. Reinforcing gussets 30 are secured between the tie bar 24 and the stiffeners 18. From the construction of the rectangular framework 16 hereinbefore described, it can be seen that a rigid framework is provided.

Means is provided for supporting the rectangular framework 16 upon the support framework 12 to provide a plane for the travel of an optical table 28. A three point mounting is provided for this purpose and consists of three small blocks or plates 31 which serve as feet for the rectangular framework, as can be seen from FIG. 1. One of the blocks or feet 31 underlies the tie bar 24 and is positioned midway between the ends of the tie bar 24 and rests upon the support framework 12. The two other blocks or feet 31 are provided on opposite sides of the rectangular framework 16 and underlie the two stiffeners 20 at points which are spaced a substantial distance beyond the mid points of the rods 17 with respect to the foot 31 underlying the tie bar 24 so as to provide a maximum support for the rectangular framework 16. At the same time, full travel of the table 28 is provided as hereinafter described with only three supports for the rectangular framework 16. The two feet 31 underlying the stiffeners 20 are supported upon the channel members 13. With this manner of support it can be seen that a portion of the rectangular framework 16 is cantilevered over the ends of the feet or blocks 31. However, it can be seen that the portion of the rectangular framework 16 which is cantilevered is relatively small in proportion to the remaining portion of the rectangular framework so that adequate structural support is provided for the rectangular framework 16.

From the construction of the rectangular framework hereinbefore described, it can be seen that the rectangular framework can be readily assembled and that as soon as it is assembled because of the prior precision machining of the parts, a rectangular framework is provided in which the centerless ground rods 17 are essentially spaced apart and parallel. No other alignment is necessary.

The optical table 28 is provided with an upper planar surface 28. The table 28 is constructed of a material so that it is very rigid. For example, it can be constructed of honeycomb to give the desired rigidity. By way of example, a typical optical table could have a thickness of approximately 2½ inches and could have a length of approximately 3 feet and a width of 2 feet. Carriage means is provided for supporting this optical table at three points upon the rectangular framework 16. For this purpose a pair of carriages 36 are provided which are mounted upon one of the rods 17 to permit relative movement between the carriages 36 and the rod 17 axially of the rod or rail 17 but not transversely of the rod 17.

Each of the carriages 36 consists of a carriage block 37 which is secured to one side of the table 28 by cap screws 38 extending through a doubler plate 39 provided on the bottom of the table (see FIG. 2). Each carriage block 37 is provided with an arcuate recess 41 which is formed to accommodate the rod 17. First and second cylindrical wells 42 and 43 are provided in the carriage block 37 which are formed to receive rollers 44. The rollers 44 are adapted to rest upon the rod 17 as shown in FIG. 2. The rollers are formed of a material which is softer than the material of which the rod 17 is formed so that any wear will be taken by the rollers rather than by the rod. Thus it can be appreciated that the rollers, when worn, can be replaced. For example, the rod 17 and the rollers 44 can be formed of stainless steel. The rollers 44 are mounted by ball bearing assemblies 46 upon shafts 47 which are mounted by a press fit into holes 48 and 49 provided in the carriage block 37. The holes 48 and 49 are formed in the block 37 so that they extend at approximately 60° angles or for a total of 120° angles between the same. With the construction of the carriage hereinbefore described it can be seen that the two rollers 44 provided on each of the carriage blocks re-engage the rod on surfaces which are spaced approximately 120° apart. The two carriages 36 are provided adjacent the opposite ends of the table 28 and thus provide two of the points for supporting or suspending the table 28.

The third support for the three point mounting for the table 28 is provided in the form of additional carriage means consisting of a mounting block 51 which is secured to the side of the table 28 opposite the carriages 36 mid-point between the ends of the table and the carriages 36 and is secured to the table by cap screws 52 extending through a doubler plate 53. A shaft 54 is mounted in a hole 56 provided in the block 51 and extends in a generally horizontal direction parallel to the surface 29 of the plate 28. The shaft 54 seats in an oversized hole 55 which is generally V-shaped at the bottom (see FIG. 6).

The oversized hole 55 is provided in an evener 57 which is in the form of an elongate bar. A roller trunion 58 is mounted on each end of the evener 57 and is secured thereto by cap screws 60 (see FIG. 5). A slot 59 is provided in the outside portion of the trunion 58. A roller 61 formed of the same material as the rollers 44 is disposed in the slot 59 and is rotatably mounted upon a shaft 62 mounted in the trunion 58. It can be seen that the evener 57 is of such a length that the rollers 61 engage the other rod 17 in the vicinity of the opposite ends of the table 28.

A dampening mechanism 66 is provided at each end of the evener 57 and consists of a bracket 67 which is secured to the table 28 by cap scres 68 extending through a doubler plate 69 (see FIG. 3). A flat washer 71 is carried by the bracket 67 and frictionally engages the surface of the trunion 58. The washer 71 is held in place by a shoulder screw 72 that extends through a large oversized hole 70 provided in the trunion 58 and which extends through the washer 71 and is threaded into the bracket 67 with its shoulder 73 engaging the bracket. The shoulder screw 72 carries the curved spring washer 74 which is engaged by the head of the shoulder screw and applies a yieldable frictional force between the trunion 58 and the washer 71.

A drive mechanism 76 is connected between the rectangular frame and the plate 28 for causing relative movement between the rectangular framework 16 and the plate 28. This drive mechanism 76 consists of a transfer block 77 which is secured to the table 28 by cap screws (not shown) in the same manner that the carriage blocks 36 are secured to the table. The transfer block is provided with an arcuate recess 78 for receiving the rod 17 underlying the same. The transfer block 77 is secured to a plate 79 by cap screws (not shown). The drive mechanism 76 is described in more detail, U.S. Pat. No. 4,131,029. It includes a drive motor 80, a tachometer 81, a shaft encoder 82, a bearing housing 83, and a ball nut housing 84 all of which are provided for driving a long lead screw 86 which has its remote end mounted in a bearing bracket 88 secured to the stiffener 20. The bearing housing 83 is carried by a bracket 89 also secured to the stiffener 20. The lead screw 86 has suitable threads thereon as, for example, to provide one inch of movement longitudinally or axially of the screw for every five revolutions of the lead screw.

The table 28 can carry any number of plurality of optical elements such as optical elements described in copending application, Ser. No. 805,445, filed June 10, 1977, abandoned in favor of Ser. No. 941,763, filed Sept. 13, 1978 as described therein. The optical elements can include a mirror for receiving a laser beam and directing it upwardly through a hole (not shown) in the table 28 to a scanning assembly consisting of a rotating pyramid mirror 91 and then through two roof mirrors 92 and 93 and then to a dichroic mirror (not shown) which can reflect light back onto a turning mirror to exit the light beam through a hole (not shown) in the table. By way of example, such a system can be utilized for scanning any black/white light input copy and reproduce the same image on any photo-sensitive material utilizing a laser beam. During the scanning operation the table is advanced at a precision rate to travel the length of the rectangular framework and then to return.

From the foregoing it can be seen that there has been provided a precision traveling optical table assembly which may have numerous applications. As pointed out previously, the table itself is very stiff and is supported on the rails or rods 17 at three points. The two carriages 36 support one edge of the table vertically and they also provide alignment along the direction of movement by virtue of the fact that each of the carriages is provided with two pairs of rollers which engage spaced apart surfaces on the rod to restrain transverse movement of the table with respect to the rod 17 while at the same time permitting movement longitudinally of the rod. Even though the table 28 is only supported at one point on its other side opposite the side on which the carriages 36 are provided, the table in effect is supported at the four corners by the provision of the evener bar 57 carrying the trunions 58 and the rollers 61 which travel on the top of the other of the rails or rods 17. The dampening mechanism 66 provided at each end of the table and associated with the trunions 58 serve to stabilize the table to in effect provide a four point support for the table insofar as vibration and weight are concerned but still providing only three supports for the table itself.

It can be seen that the support for the table is provided in such a manner so that even though the rails or rods 17 are not perfectly parallel, the rollers 61 would take care of any misalignment because they ride on top of the rail or rod 17. As best seen in FIG. 3, rollers 61 are of sufficient width that they can shift laterally on the upper surface of rails 17 without disturbing the orientation of the table about an axis parallel to the rails. Yet by the use of the dampening mechanism, the weight of the table 28 is supported at the four corners of the table. It also can be seen that from the construction of the table and in the manner in which it is mounted upon the rails 17, the table 28 with the carriages 36 and the mounting block 51 and the associated evener 57 can be lifted from the rectangular framework 16 merely by disconnecting the cap screws from the transfer plate 79. In this regard, it will be noted that rollers 44 and 61 rest on the upper portions of rails 17 and that the table assembly can be lifted freely from the rails in a vertical direction. With the construction shown it can be seen that alignment is only provided from one side to form one of the rails or rods 17 and that the other side is merely resting on the other rod or rail 17.

It should be appreciated that there also has been provided a three point mounting for the rectangular framework of which the rods 17 form a part. Because of this construction, considerable misalignment can be tolerated by the various parts while still providing a precision traveling optical table assembly which will operate satisfactorily. The construction as shown can accommodate misalignment of the parallel rods 17 in either a horizontal plane or a vertical plane. In addition to these advantages, the precision traveling optical table assembly is relatively simple in construction and can be readily disassembled and assembled.

What is claimed is:

1. In a precision optical table assembly, a rigid rectangular framework, said rigid rectangular framework including a pair of space parallel rails, at least one of said rails having a horizontally extending top surface, an optical table, carriage means mounted on one side of said table and engaging one of said pair of rails to inhibit lateral movement of the table with respect to the rail while permitting longitudinal movement of the table with respect to the rails, additional carriage means carried by the other side of the table and engaging only the horizontally extending top surface of the other rail to permit both longitudinal and lateral movement of the additional carriage means with respect to the other rail without changing the orientation of the optical table, said carriage means and said additional carriage means engaging said pair of rails in a manner permitting the optical table to be freely lifted from the rails in a vertical direction, and drive means connected between the rectangular framework and the table for causing relative longitudinal movement between the table and the rectangular framework.

2. An optical table assembly in claim 1 wherein said rails are in the form of cylindrical rods and wherein said carriage means mounted on one side include rollers which engage said one rail at points which are spaced apart circumferentially.

3. In a precision optical table assembly, a rigid rectangular framework, said rigid rectangular framework including a pair of spaced parallel rails, an optical table, carriage means mounted on one side of said table and engaging one of said pair of rails to inhibit lateral movement of the table with respect to the rails while permitting longitudinal movement of the table with respect to the rails and additional carriage means carried by the other side of the table and solely engaging the top surface of the other rail to permit lateral movement of the additional carriage means with respect to the other rail while permitting movement of the table longitudinally of the rails, and drive means connected between the rectangular framework and the table for causing relative longitudinal movement between the table and the rectangular framework, said additional carriage means including an evener, means for forming a connection with the mid-point of the evener and the mid-point of the table along one edge of the table and rollers carried by the ends of the evener engaging the top surface of the other rail.

4. An optical table assembly as in claim 3 wherein said means for forming a connection between the evener and the table includes a bracket secured to the table and a shaft secured to the bracket, said evener having an oversized hole therein, said shaft being seated in said hole.

5. An optical table assembly as in claim 4 wherein the lower extremity of said hole in said evener is substantially V-shaped.

6. An optical table assembly as in claim 4 together with a dampening mechanism secured to the evener and to opposite ends of the table on the same side of the table as the additional carriage means is provided for supporting the weight of the table along two points while providing suspension of that side of the table at one point.

7. An optical table assembly as in claim 1 together with means for mounting said rectangular framework including supports at only three locations engaging said rectangular framework.

8. In a precision traveling optical table assembly, a rigid support framework, a rigid rectangular framework, means supporting said rectangular framework upon said support framework at only three locations, said rectangular framework including a pair of rails, an optical table, carriage means mounted on said pair of rails to permit relatively longitudinal movement between the carriage means and the rails, means for supporting said optical table on said carriage means at only three locations on said optical table, means connected between said carriage means and said rectangular framework for causing relative longitudinal movement between said table and said rectangular framework, said carriage means comprising first and second carriages secured to one side of the table and additional carriage means on the other side of the table, said additional carriage means including an evener, means securing the other side of the table to the mid-point of the evener, and rollers carried by the ends of the evener for engaging the top surface of the rail.

9. In a precision traveling optical table assembly, a rigid support framework, a rigid rectangular framework, means supporting said rectangular framework including a pair of spaced parallel rails, an optical table, carriage means mounted on said pair of rails to permit relative longitudinal movement between the carriage means and the rails, means for supporting said optical table on said carriage means at only three locations on said optical table, means connected between said carriage means and said rectangular framework for causing relative longitudinal movement between said table and said rectangular framework, and a dampening mechanism secured to each end of the table on one side of the table and serving to support the weight of the table at four points while permitting alignment of the table with respect to the three locations.

10. In a precision optical table assembly: a framework having a pair of generally parallel horizontally extending cylindrical guide rods, first and second carriages each having a pair of rollers engaging circumferentially spaced points on opposite sides of the upper portion of one of the guide rods for rolling movement along the length of the rod, a third carriage having a roller engaging the uppermost surface of the second guide rod for rolling movement along the length of said second rod, and an optical table supported by the carriages and having a predetermined orientation relative to the guide rods, the roller of said third carriage being of sufficient width to permit said roller to move laterally on the uppermost surface of the second guide rod without disturbing the orientation of the optical table.

11. The optical table assembly of claim 10 wherein the third carriage is elongated and has two rollers which engage the uppermost surface of the second guide rod at points spaced along the length thereof, and means connecting said carriage to the optical table at a point between the spaced rollers.

* * * * *